(12) United States Patent
Igarashi et al.

(10) Patent No.: US 12,481,017 B2
(45) Date of Patent: Nov. 25, 2025

(54) POSITIONING SYSTEM

(71) Applicant: ALPS ALPINE CO., LTD., Tokyo (JP)

(72) Inventors: Taiki Igarashi, Miyagi (JP); Daisuke Takai, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 300 days.

(21) Appl. No.: 18/484,757

(22) Filed: Oct. 11, 2023

(65) Prior Publication Data

US 2024/0133990 A1 Apr. 25, 2024
US 2024/0230818 A9 Jul. 11, 2024

(30) Foreign Application Priority Data

Oct. 20, 2022 (JP) .................. 2022-168211

(51) Int. Cl.
*G01S 3/46* (2006.01)
*G05D 1/247* (2024.01)
*G05D 1/46* (2024.01)
*G05D 109/25* (2024.01)

(52) U.S. Cl.
CPC ............ *G01S 3/46* (2013.01); *G05D 1/247* (2024.01); *G05D 1/46* (2024.01); *G05D 2109/254* (2024.01)

(58) Field of Classification Search
None
See application file for complete search history.

(56) References Cited

U.S. PATENT DOCUMENTS

2021/0286044 A1* 9/2021 Knuuttila ............ G01S 5/0284

FOREIGN PATENT DOCUMENTS

JP H02-245683 10/1990

* cited by examiner

*Primary Examiner* — Vladimir Magloire
*Assistant Examiner* — Ashley Brown Raynal
(74) *Attorney, Agent, or Firm* — IPUSA, PLLC

(57) ABSTRACT

A positioning system includes an elevation angle calculator that determines, as a second elevation angle, an inverse cosine of a first value, upon occurrence of a condition in which an absolute value of a first elevation angle is greater than or equal to a second predetermined angle, the second predetermined angle being greater than a first predetermined angle, the first value being obtained by dividing a second value that is obtained by correcting, with a correction value, an altitude measured by an altitude measurement unit, by a distance measured by a distance measurement unit. The elevation angle calculator selects any one of the first elevation angle and the second elevation angle, based on a value of the first elevation angle.

7 Claims, 6 Drawing Sheets

POSITIONING SYSTEM

CROSS-REFERENCE TO RELATED APPLICATIONS

This application claims priority to Japanese Patent Application No. 2022-168211, filed Oct. 20, 2022, the entire contents of which are incorporated herein by reference.

BACKGROUND

1. Field of the Invention

The present disclosure relates to a positioning system.

2. Description of the Related Art

There has been measurement of angles of arrival (AoA) that measure (estimate) angles of arrival of radio waves by using a phase difference occurring in a case where the radio waves are received by a plurality of antenna elements. In the AoA, an array antenna including a plurality of rectangular antenna elements or a plurality of circular antenna elements is used to measure the angles of arrival of the radio waves, by using the phase difference between the antenna elements. In the array antenna used for the AoA, given antenna elements are selected while switching the antenna elements by which the radio waves are to be received. With this arrangement, one or more phases are obtained when the radio waves are received by the antenna elements while switching the antenna elements that receive the radio waves. Thus, the phase difference between the antenna elements is obtained, and arrival directions of the radio waves is measured (see Patent Document 1).

RELATED-ART DOCUMENT

Patent Document

[Patent Document 1] Japanese Unexamined Patent Application Publication No. Hei 02-245683

When the arrival directions of the radio waves are measured based on the AoA, using the array antenna as described above, errors in the phase difference occurring at the array antenna are increased when the elevation angle is large.

It is an object of the present disclosure to provide a positioning system capable of reducing errors in a measured angle, by determining an elevation angle based on a distance that is obtained by making corrections when the elevation angle is large.

SUMMARY

A positioning system according to an embodiment of the present disclosure includes a first communication unit, an aircraft movable with respect to the first communication unit, and a second communication unit provided on the aircraft and configured to communicate with the first communication unit. The positioning system includes an altitude measurement unit provided on the aircraft and configured to measure an altitude of the aircraft with respect to the first communication unit. The positioning system includes a distance measurement unit configured to measure a distance between the first communication unit and the aircraft, based on a propagation time, or a phase, of at least one signal that is communicated between the first communication unit and the second communication unit. The positioning system includes an elevation angle calculator configured to determine a first elevation angle of the aircraft with respect to the first communication unit, based on phases that are obtained in a case where signals communicated between the first communication unit and the second communication unit are received by multiple antenna elements, of the first communication unit, or the second communication unit. The positioning system includes a correction calculator configured to determine, as a correction value, a difference between the altitude measured by the altitude measurement unit and the distance measured by the distance measurement unit, upon occurrence of a condition in which an absolute value of the first elevation angle is a first predetermined angle or smaller. After the correction calculator determines the correction value, the elevation angle calculator is configured to determine, as a second elevation angle, an inverse cosine of a first value, upon occurrence of a condition in which the absolute value of the first elevation angle is greater than or equal to a second predetermined angle, the second predetermined angle being greater than the first predetermined angle, the first value being obtained by dividing a second value that is obtained by correcting, with the correction value, the altitude measured by the altitude measurement unit, by the distance measured by the distance measurement unit. The elevation angle calculator is configured to select any one of the first elevation angle and the second elevation angle, based on a value of the first elevation angle.

DETAILED DESCRIPTION

One or more embodiments are described below using a positioning system of the present disclosure.

Embodiments

Figure 1:
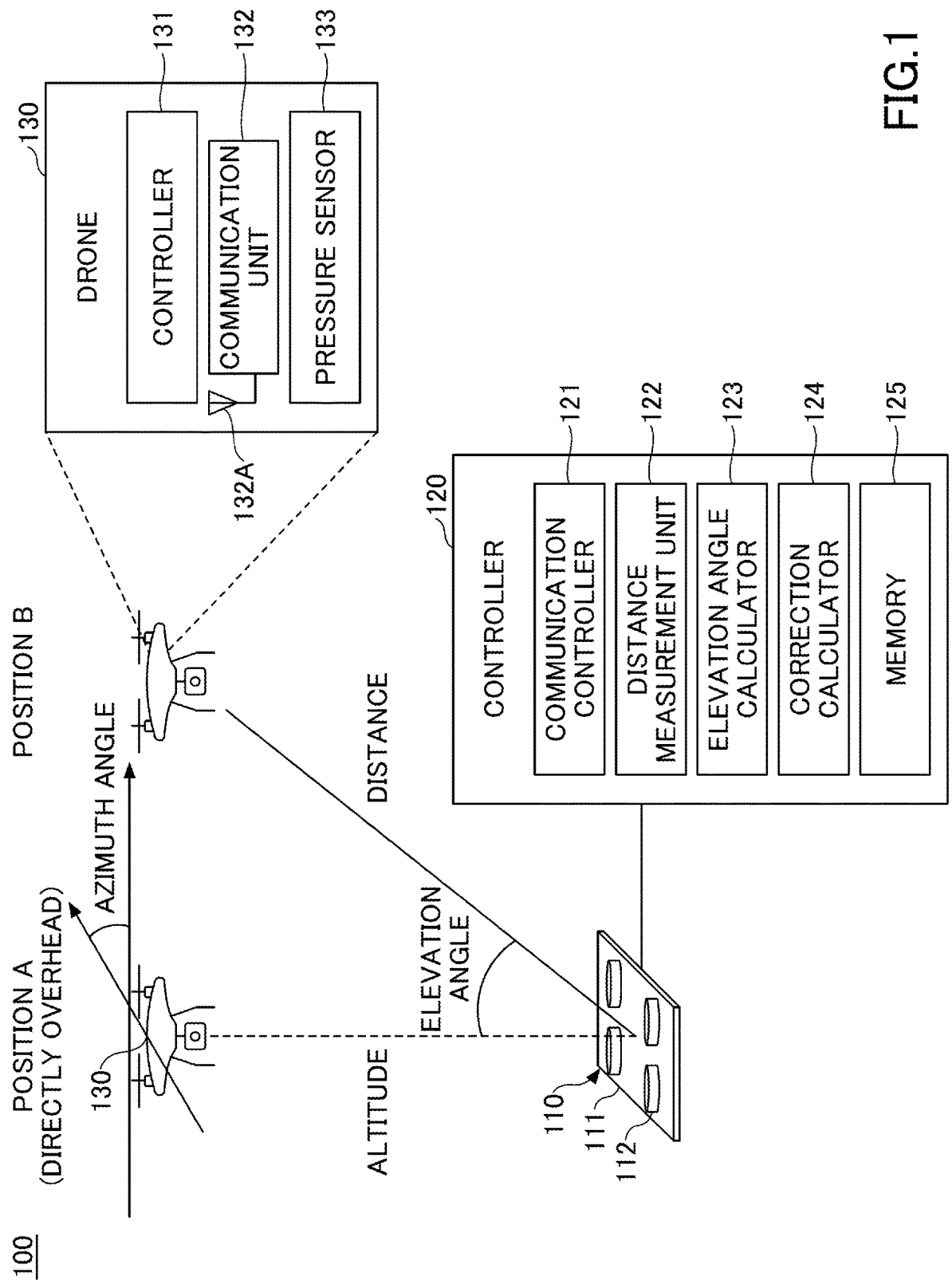
FIG. 1 is a diagram illustrating a configuration example of a positioning system according to an embodiment.

FIG. 1 is a diagram illustrating a configuration example of a positioning system 100. The positioning system 100 includes an array antenna 110, a controller 120, and an aircraft 130. The array antenna 110 is an example of a first communication unit.

The controller 120 in the positioning system 100 measures (estimates) an elevation angle and an azimuth angle of the aircraft 130 with respect to the array antenna 110, based on an angle of arrival (AoA) technique. In addition, the controller 120 measures (estimates) a distance between the array antenna 110 and the aircraft 130, based on a time of arrival (ToA) technique. The elevation angle and the azimuth angle are given using a polar coordinate system in which the center of a surface of the array antenna 110 is defined as the origin O.

<Array Antenna 110>

The array antenna 110 includes a substrate 111 and four antenna elements 112. The substrate 111 is a substrate made of an insulator, and the four antenna elements 112 are provided on an upper surface of the substrate 111. For example, the array antenna 110 is installed on the ground or a fixed object provided on the ground, and is coupled to the controller 120 through a line.

The four antenna elements 112 are arranged at equal intervals on the upper surface of the substrate 111. More specifically, the four antenna elements 112 are arranged such that the center of each antenna element 112 in a plan view is located at a vertex of a square in the plan view. FIG. 1 illustrates the antenna elements 112 each having a circular shape in the plan view, but each antenna element 112 may have a rectangular shape in the plan view.

<Controller 120>

The controller 120 is coupled to the array antenna 110. The controller 120 may be implemented by a computer including a central processing unit (CPU), a random access memory (RAM), a read only memory (ROM), an input-and-output interface, an internal bus, and the like.

The controller 120 includes a communication controller 121, a distance measurement unit 122, an elevation angle calculator 123, a correction calculator 124, and a memory 125. Functions given as the communication controller 121, the distance measurement unit 122, the elevation angle calculator 123, and the correction calculator 124 are implemented by a program that is executed by the controller 120, and are illustrated by respective functional blocks. The memory 125 is functionally illustrated as a memory of the controller 120.

The communication controller 121 performs a process to communicate with a communication unit 132 of the aircraft 130 through the array antenna 110. The communication controller 121 selects one or more antenna elements 112 to be used for communications, from the four antenna elements 112 in the array antenna 110. The communications are implemented, for example, by Bluetooth low energy (BLE) (registered trademark), a wireless local area network (WLAN), or the like. In the following description, for example, a mode in which the controller 120 and the communication unit 132 of the aircraft 130 communicate with each other by BLE will be described. The communications include data communications that are performed to measure one or more distances and one or more angles and to communicate data such as a phase obtained when a BLE signal is received.

The distance measurement unit 122 measures a distance between the array antenna 110 and the aircraft 130, based on a propagation time or a phase of a signal that is communicated between the array antenna 110 and the communication unit 132 of the aircraft 130. More specifically, the distance measurement unit 122 measures the distance with the ToA technique, by using any one of the four antenna elements 112 in the array antenna 110.

For example, the distance measurement unit 122 transmits signals at frequencies f1 to fN (N is an integer of 2 or greater) from a given antenna element 112 to the communication unit 132 of the aircraft 130, and then the distance measurement unit 122 receives the signals at the frequencies f1 to fN from the communication unit 132 of the aircraft 130, by using the given antenna element 112. The distance measurement unit 122 communicates with the aircraft 130 to obtain, from the communication unit 132 of the aircraft 130, data indicating a phase that is obtained in a case where the communication unit 132 of the aircraft 130 receives the signal at each frequency.

The distance measurement unit 122 determines, for each frequency, a total phase (round trip phase) of a given phase of the signal obtained in a case where the antenna element 112 receives the signal of the frequency from the communication unit 132 and, a given phase in a case where the communication unit 132 of the aircraft 130 receives the signal of the given frequency. Then, the distance measurement unit 122 measures the distance between the array antenna 110 and the aircraft 130, based on the relation of the frequencies with respect to the round trip phase at each of the frequencies.

Instead of using the approach to measure the distance described above, the distance measurement unit 122 may measure the distance by another approach. In this case, the distance measurement unit 122 measures (i) a first propagation time of the signal that is transmitted from the antenna element 112 to the communication unit 132 of the aircraft 130 or (ii) a second propagation time of the signal that is transmitted from the communication unit 132 of the aircraft 130 to the antenna element 112. Then, the distance measurement unit 122 multiplies the measured first or second propagation time by the speed of light to thereby measure the distance between the array antenna 110 and the aircraft 130. The process by the distance measurement unit 122 will be described below with reference to the flowcharts illustrated in FIGS. 4A and 4B.

The elevation angle calculator 123 uses two or more antenna elements 112 of the four antenna elements 112 in the array antenna 110, to measure an elevation angle, and an azimuth angle of the aircraft 130 with respect to the array antenna 110, by using the AoA technique, where the aircraft 130 is at a location in the polar coordinate system. By use of the AoA technique or the ToA technique, the elevation angle calculator 123 also measures the elevation angle and the azimuth angle, based on a phase difference that is obtained in a case where the BLE signal that is transmitted from the communication unit 132 of the aircraft 130 is received by the two or more antenna elements 112. The process by the elevation angle calculator 123 will be described below with reference to the flowcharts illustrated in FIGS. 4A and 4B.

When an absolute value of a first elevation angle that is determined by the elevation angle calculator 123 is a first predetermined angle or smaller, the correction calculator 124 determines a difference between the altitude that is obtained by a pressure sensor 133 and the distance measured by the distance measurement unit 122, as a correction value. The correction value will be described below with reference to FIGS. 3A and 3B.

The memory 125 stores a program, which is to be executed by the controller 120 to perform processing, and data and the like necessary for the processing.

<Aircraft 130>

The aircraft 130 includes, for example, a drone, and is an unmanned aerial vehicle (UAV). The aircraft 130 includes a controller 131, the communication unit 132, and the pressure sensor 133.

The aircraft 130 flies in accordance with a control signal that is transmitted from a remote controller (not illustrated). For example, a camera is mounted on the aircraft 130. In an example, the aircraft 130 operates the camera, for example, based on a taking signal that is transmitted from the remote controller to take a still image (photograph) or a moving image (video).

The controller 131 is implemented by a computer including a CPU, a RAM, a ROM, an input-and-output interface, an internal bus, and the like. In the aircraft 130 in FIG. 1, a reception unit that receives the control signal from the remote controller in the aircraft 130 is omitted. However, the controller 131 performs a flight control and the like of the aircraft 130, in accordance with the control signal received from the remote controller.

The communication unit 132 includes the antenna elements 132A, and communicates with the array antenna 110, by using the BLE. The communication unit 132 is an example of a second communication unit. The communications include data communications in addition to including communications that are performed to measure one or more distances and one or more angles.

The pressure sensor 133 is a sensor that converts a pressure into an altitude to output the altitude. The pressure sensor 133 measures the altitude of the aircraft 130 with respect to the array antenna 110. The pressure sensor 133 is an example of an altitude measurement unit. The controller 131 transmits data indicating the altitude to the array antenna 110 through the communication unit 132. The data is input to the controller 120.

The present embodiment is described using a case where the pressure sensor 133 converts the pressure into the altitude to output the altitude. However, the pressure sensor 133 may output data indicating the pressure. In this case, it is sufficient when the controller 120 converts the pressure into the altitude. In addition, the present embodiment is described using a case where the pressure sensor 133 is used to measure the altitude of the aircraft 130. However, a device or the like other than the pressure sensor 133 that can measure the altitude of the aircraft 130 may be used.

<Error in Elevation Angle Obtained by Measuring Angle>

Figure 2:
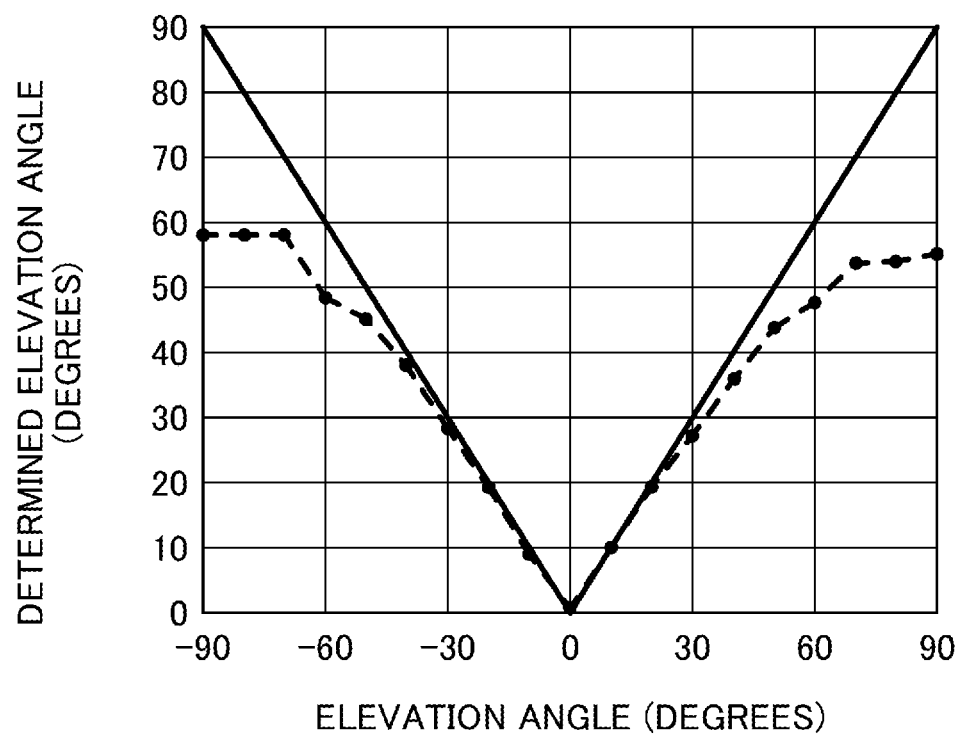
FIG. 2 is a diagram illustrating an error in an elevation angle of an aircraft with respect to an antenna array in which an elevation angle calculator determines the elevation angle based on an AoA.

FIG. 2 is a diagram illustrating an error in an elevation angle of the aircraft 130 with respect to the array antenna 110, where the elevation angle is determined using the AoA technique by the elevation angle calculator 123. In FIG. 2, the horizontal axis expresses an actual elevation angle, and the vertical axis expresses a determined elevation angle. A solid line indicates the relation between a theoretical value of the elevation angle, which is determined using the AoA technique by the elevation angle calculator 123, and the actual elevation angle. A broken line indicates the relation between the elevation angle, which is actually determined using the AoA technique by the elevation angle calculator 123, and the actual elevation angle. The theoretical value of the elevation angle determined using the AoA technique by the elevation angle calculator 123 is an elevation angle that is determined in a case where the four antenna elements 112 have no difference in arrangement on the substrate 111 and in an environment, and have the same phase characteristics.

The four antenna elements 112 in an actual array antenna 110 have different phase characteristics, depending on the arrangement on the substrate 111 and the difference in the environment, such as a positional relation with an object at a ground potential and around the array antenna. For this reason, as illustrated in FIG. 2, when an absolute value of the determined elevation angle becomes about 60 degrees or greater, a deviation from the theoretical value becomes great to the extent that the deviation is not be negligible.

In the positioning system 100 according to the embodiment, when the absolute value of the elevation angle determined using the AoA technique becomes about 60 degrees or greater, the error becomes large. Thus, the elevation angle calculator 123 determines the elevation angle by a technique using ToA, instead of using the AoA technique. In the following description, a given elevation angle determined using the AoA technique by the elevation angle calculator 123 is referred to as a first elevation angle, and a given elevation angle determined using the ToA technique is referred to as a second elevation angle. The first elevation angle is an example of a first elevation angle, and the second elevation angle is an example of a second elevation angle. For the azimuth angle of the aircraft 130 that is determined by the elevation angle calculator 123 using the AoA technique, the deviation from a given theoretical value is within an allowable range. With this arrangement, the azimuth angle determined by the elevation angle calculator 123 using the AoA technique is used as an azimuth angle of the aircraft 130.

<Method for Correcting Altitude Using Correction Value>

Figure 3A:
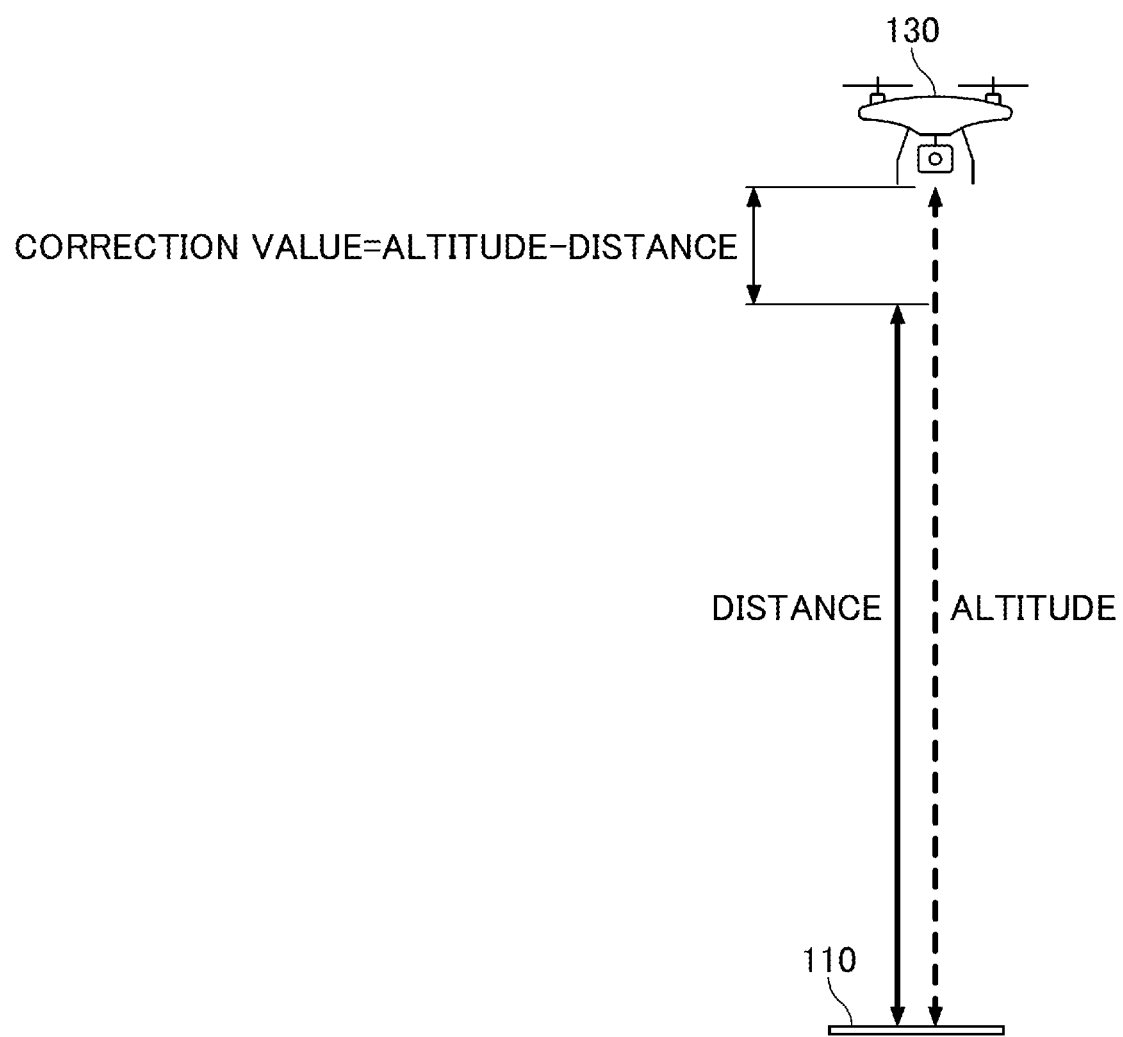
FIG. 3A is a diagram for describing an approach to determine a correction value.
Figure 3B:
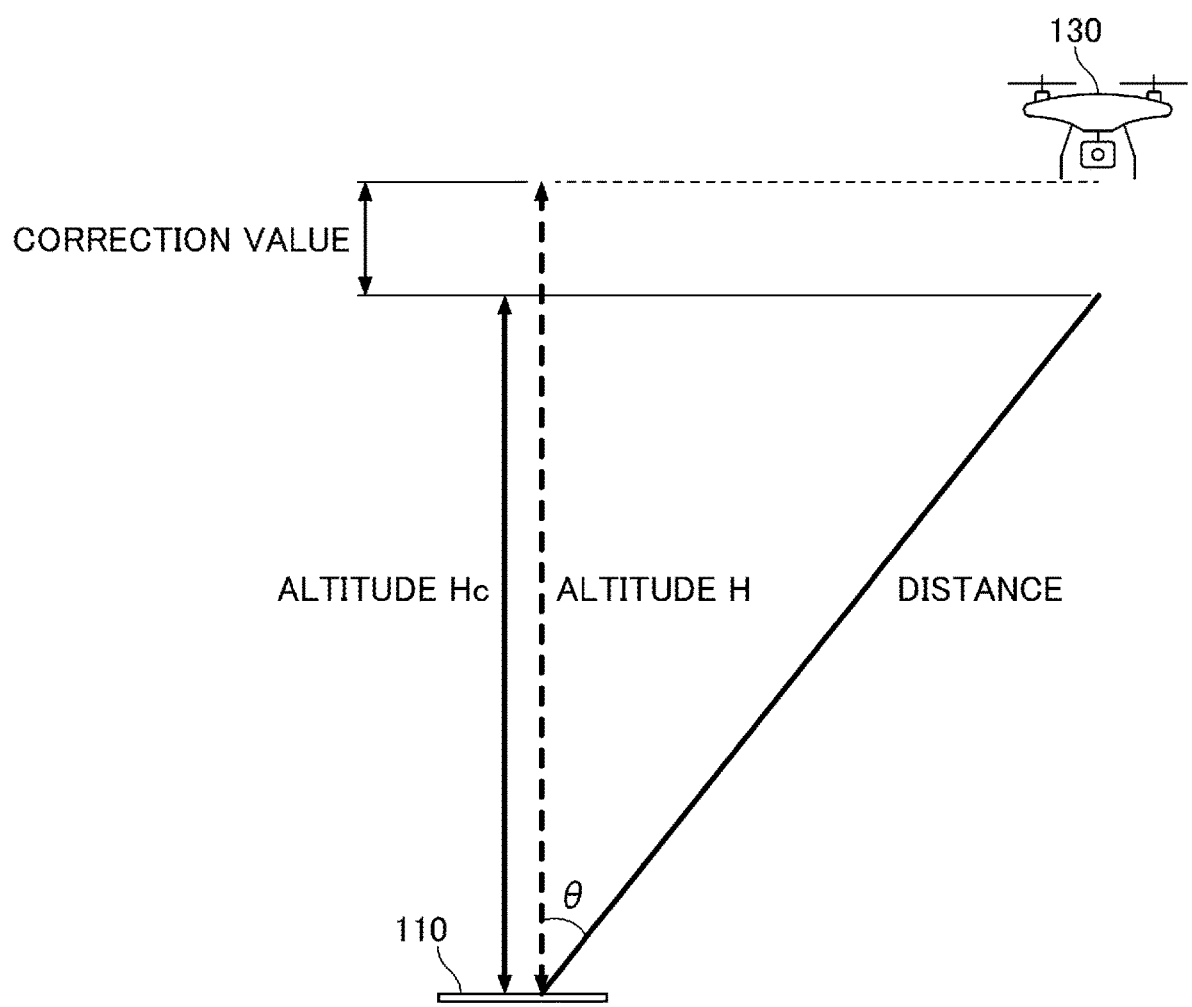
FIG. 3B is a diagram for describing a method of correcting an altitude using the correction values.

FIG. 3A is a diagram for describing an approach to determine a correction value. FIG. 3B is a diagram illustrating a method for correcting the altitude based on the correction value.

In FIG. 3A, the altitude measured by the pressure sensor 133, which is mounted on the aircraft 130, is indicated by a broken line. When the aircraft 130 is directly above the array antenna 110, the distance measured using the ToA technique by the distance measurement unit 122 is indicated by a solid line. When the aircraft 130 is directly above the array antenna 110, the distance measured using the ToA technique by the distance measurement unit 122 corresponds to the altitude of the aircraft 130.

The altitude measured by the pressure sensor 133 is measured with high accuracy, in comparison to the distance that is measured using the ToA technique by the distance measurement unit 122. In view of the situation described above, there is a difference between the altitude measured by the pressure sensor 133 and the distance measured using the ToA technique by the distance measurement unit 122.

In the present embodiment, a value that is obtained by subtracting the distance measured using the ToA technique by the distance measurement unit 122, from the altitude measured by the pressure sensor 133 is determined as a correction value. A process of determining the correction value is performed by the correction calculator 124. The correction value is used to correct the altitude measured by the pressure sensor 133 to a value that is obtained based on the ToA, in a case where the elevation angle calculator 123 determines the elevation angle by using the ToA technique.

As illustrated in FIG. 3B, when an elevation angle θ of the aircraft 130 is large, and thus is a second predetermined angle or greater, the elevation angle θ is determined by obtaining an inverse cosine (acos) of a first value, which is obtained by dividing an altitude Hc by the distance that is measured using the ToA technique by the distance measurement unit 122, where the altitude Hc is obtained by subtracting a correction value from an altitude H that is measured by the pressure sensor 133, which is mounted on the aircraft 130. This process is performed by the elevation angle calculator 123, and is a method in which the elevation angle calculator 123 determines the second elevation angle, using the ToA technique. The altitude Hc is expressed by altitude Hc=altitude H-correction value.

The second elevation angle is expressed by Equation (1) below. Accuracy of the pressure sensor 133 is about several centimeters, while accuracy of the ToA is about several tens of centimeters. That is, the pressure sensor 133 differs from the ToA in the accuracy. In view of the situation described above, the second elevation angle is corrected using a value that is obtained by the pressure sensor 133.

$$\text{The second elevation angle} = a\cos\{(\text{altitude H-correction value})/\text{distance}\} \quad (1)$$

<Flowchart>

Figure 4A:
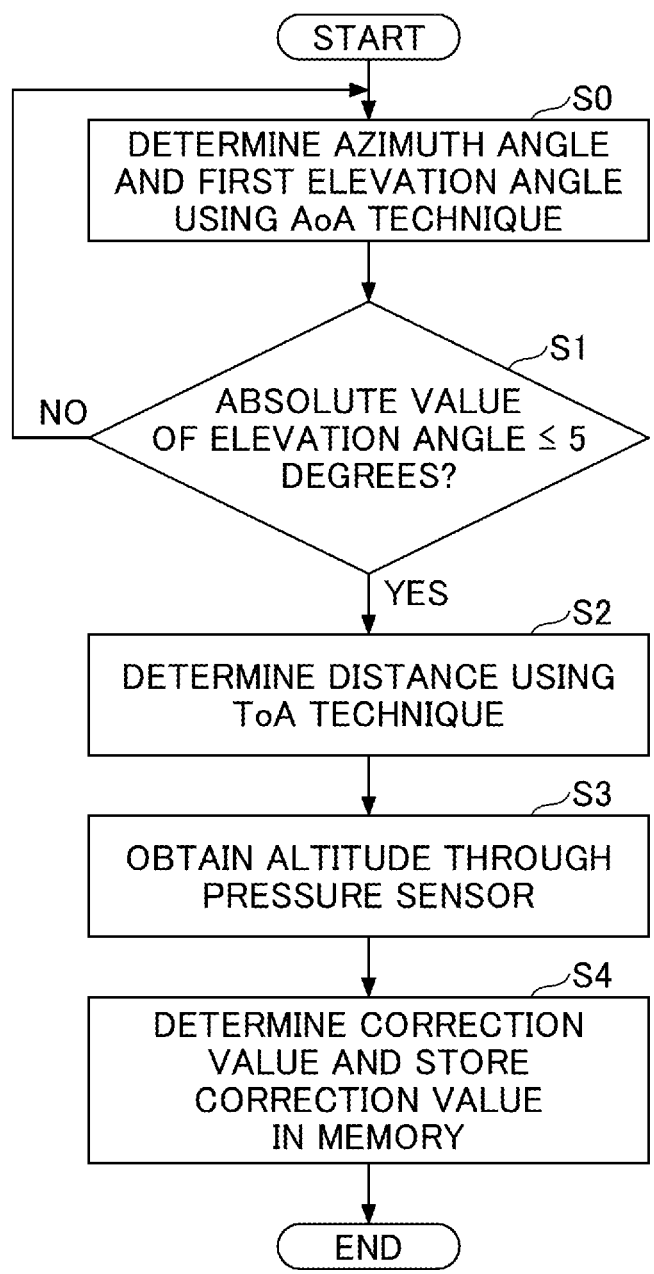
FIG. 4A is a flowchart illustrating an example of a process executed by a controller in the positioning system according to the embodiment.
Figure 4B:
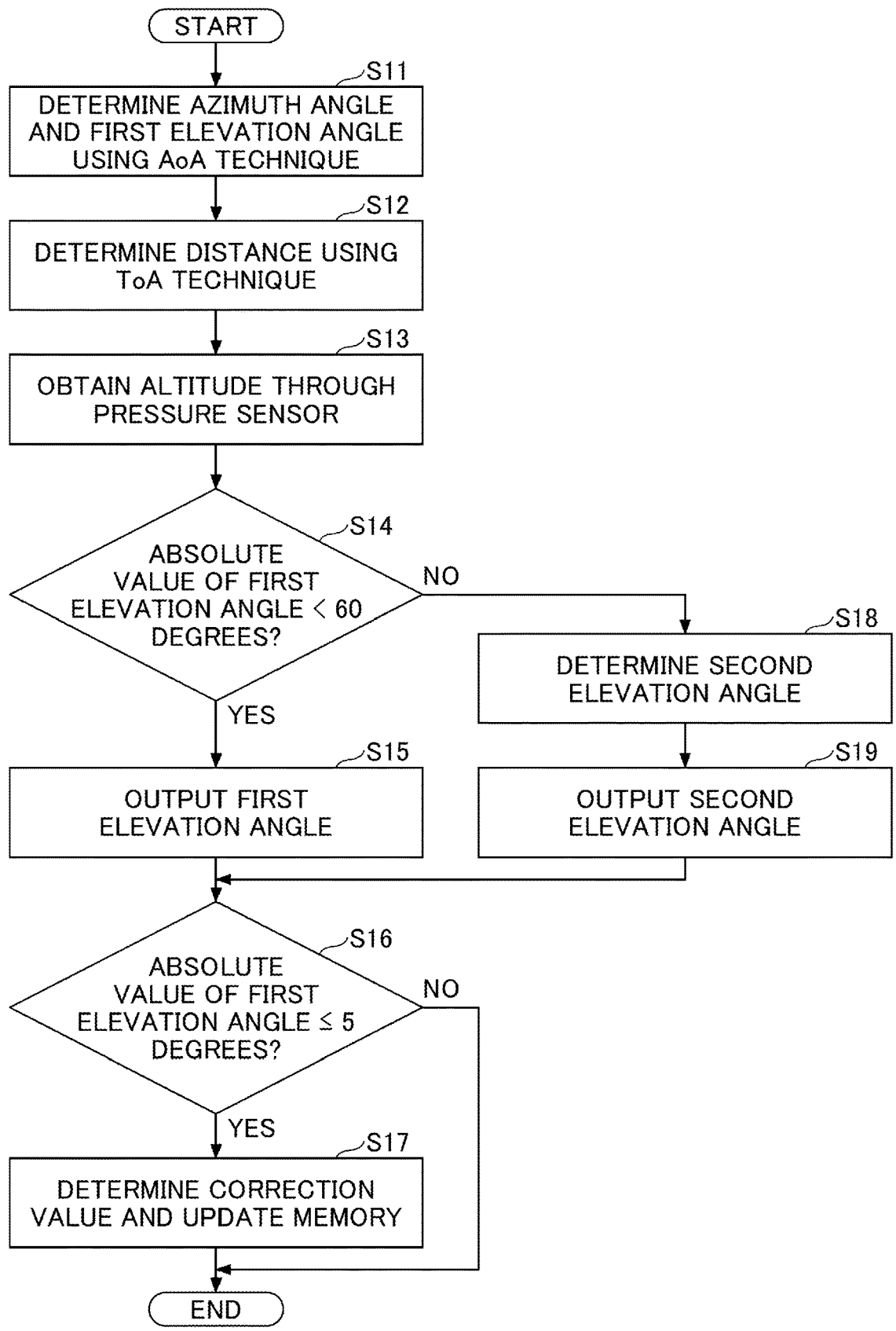
FIG. 4B is a flowchart illustrating an example of the process executed by the controller in the positioning system according to the embodiment.

FIG. 4A and FIG. 4B are flowcharts of the process performed by the controller 120.

FIG. 4A illustrates the process performed immediately after the aircraft 130 is powered up. As a premise of the process in FIG. 4A, when the aircraft 130 is powered up, the aircraft 130 flies in a mode in which an absolute value of the elevation angle is controlled to be 5 degrees or smaller. The aircraft 130 flies such that the absolute value of the elevation angle that is determined by the elevation angle calculator 123 becomes 5 degrees or smaller, while communicating with the controller 120.

If the absolute value of the elevation angle of the aircraft 130 is 5 degrees or smaller, the aircraft 130 is considered to be directly above the array antenna 110. A correction value is determined under a condition in which the aircraft 130 is directly above the array antenna 110, and thus the aircraft 130 flies such that the absolute value of the elevation angle becomes 5 degrees or smaller immediately after the power is powered up. The 5 degrees is an example of a first predetermined angle, and is an angle at which the elevation angle of the aircraft 130 that is directly above the array antenna 110 is within a predetermined range of inclined angles. The predetermined range is a range in which the aircraft 130 is considered to be present approximately directly above the array antenna 110. The present embodiment is described using a case where the first predetermined angle is 5 degrees, but the first predetermined angle is not limited to 5 degrees. It is sufficient when an appropriate value is adopted as an angle at which the aircraft 130 is considered to be approximately directly above the array antenna 110 in light of the accuracy required to use the positioning system 100, a flight range of the aircraft 130, and the like.

<Process illustrated in FIG. 4A>

When the process starts, the elevation angle calculator 123 determines an azimuth angle and a first elevation angle, with the AoA technique (step S0).

The elevation angle calculator 123 determines whether an absolute value of the elevation angle of the aircraft 130 is 5 degrees or smaller (step S1).

If the elevation angle calculator 123 determines that an absolute value of the elevation angle of the aircraft 130 is not 5 degrees or smaller (NO in S1), the process returns to step S0. If the elevation angle calculator 123 determines that an absolute value of the elevation angle of the aircraft 130 is 5 degrees or smaller (YES in S1), the process proceeds to step S2.

Then, the distance measurement unit 122 measures a distance with the ToA technique (step S2).

Then, the elevation angle calculator 123 obtains an altitude that is detected by the pressure sensor 133, from the aircraft 130 (step S3). With this approach, an azimuth angle, the first elevation angle, and the altitude, of the aircraft 130 are all obtained.

The correction calculator 124 determines a correction value, using the distance measured in step S2 and the altitude obtained in step S3, and then stores the correction value in the memory 125 (step S4). The correction value is determined by subtracting the distance from the altitude.

With this approach, the process in FIG. 4A is terminated (ends). Upon terminating the process in FIG. 4A, the controller 120 starts the process in FIG. 4B.

<Process illustrated in FIG. 4B>

When the process illustrated in 4B starts, the elevation angle calculator 123 determines an azimuth angle and a first elevation angle, with the AoA technique (step S11). When the process illustrated in FIG. 4B starts, a mode in which the absolute value of the elevation angle is controlled to be 5 degrees or smaller is off. Thus, the aircraft 130 can fly freely in accordance with the control signal from the remote controller.

Then, the distance measurement unit 122 measures the distance with the ToA technique (step S12).

The elevation angle calculator 123 obtains the altitude detected by the pressure sensor 133, from the aircraft 130 (step S13).

The elevation angle calculator 123 determines whether the absolute value of the first elevation angle determined in step S11 is smaller than 60 degrees (step S14). As illustrated in FIG. 2, the 60 degrees is a critical angle at which a difference between the elevation angle determined by the elevation angle calculator 123 and a theoretical value is great to the extent that the difference is not be negligible. The critical angle is an example of a second predetermined angle. The critical angle of 60 degrees that is used as an example of a second predetermined angle is greater than 5 degrees that is used as an example of a first predetermined angle. The second predetermined angle of 60 degrees is merely an example, and the second predetermined angle is not limited to 60 degrees. It is sufficient when the second predetermined angle is set to an angle at which it is considered preferable to use the second elevation angle instead of using the first elevation angle, in view of accuracy required for the positioning system 100, a flight range of the aircraft 130, and the like.

If it is determined that the absolute value of the first elevation angle determined in step S11 is smaller than 60 degrees (YES in S14), the elevation angle calculator 123 outputs the first elevation angle as a current elevation angle of the aircraft 130 (step S15). The elevation angle calculator 123 measures the elevation angle, using the AoA technique, based on a phase difference that is obtained in a case where a BLE signal transmitted through the communication unit 132 of the aircraft 130 is received at two or more antenna elements 112. That is, the elevation angle calculator 123 determines the first elevation angle of the aircraft 130 with respect to the array antenna 110, based on one or more phases that are obtained in a case where the signal communicated between the array antenna 110 and the communication unit 132 is received by the array antenna 110 or multiple antenna elements of the communication unit 132.

Then, the elevation angle calculator 123 determines whether the absolute value of the first elevation angle of the aircraft 130 is 5 degrees or smaller (step S16).

If the elevation angle calculator 123 determines that the absolute elevation angle of the aircraft 130 is 5 degrees or smaller (YES in S16), the correction calculator 124 determines a correction value, using the distance measured in step S12 and the altitude obtained in step S13, and then updates the correction value that is stored in the memory 125 (step S17). With this approach, the correction value is updated to a latest correction value. The correction value is determined by subtracting the distance from the altitude.

If it is determined in step S14 that the first elevation angle determined in step S11 is not smaller than 60 degrees (NO in S14), the elevation angle calculator 123 determines a second elevation angle based on Equation (1) that uses the distance measured in step S12, the altitude obtained in step S13, and the correction value stored in the memory 125 (step S18). That is, if the first elevation angle is 60 degrees or greater, the elevation angle calculator 123 determines the second elevation angle that is given by an inverse cosine of a first value, which is obtained by dividing a second value obtained by correcting, with the correction value, the altitude, which is obtained by the pressure sensor 133, by the distance measured by the distance measurement unit 122.

The elevation angle calculator 123 outputs the second elevation angle determined in step S11 as a current elevation angle of the aircraft 130, instead of using the first elevation angle determined in step S15 (step S19). Upon terminating the process in step S19, the elevation angle calculator 123 proceeds to step S16.

With this approach, the azimuth angle and the distance, and either the first elevation angle or the second elevation angle can be obtained, and thus the positioning is completed. A series of steps in the process is terminated (ends). The controller 120 repeatedly performs the process illustrated in FIG. 4B.

Effects

The positioning system 100 includes the array antenna 110, the aircraft 130 movable with respect to the array antenna 110, the communication unit 132 that is mounted on the aircraft 130 and communicates with the array antenna 110, and the pressure sensor 133 that is mounted on the aircraft 130 and measures the altitude of the aircraft 130 with respect to the array antenna 110. The positioning system 100 also includes the distance measurement unit 122 that measures the distance between the array antenna 110 and the aircraft 130, based on a propagation time, or a phase, of a signal communicated between the array antenna 110 and the communication unit 132. The positioning system 100 includes the elevation angle calculator 123 that determines a first elevation angle of the aircraft 130 with respect to the array antenna 110, based on a phase that is obtained in a case where the signal communicated between the array antenna 110 and the communication unit 132 is received by multiple antenna elements of the array antenna 110 or the communication unit 132. The positioning system 100 includes the correction calculator 124 that determines, as a correction value, a difference between the altitude obtained by the pressure sensor 133 and the distance measured by the distance measurement unit 122, if an absolute value of the first elevation angle is a first predetermined angle (for example, 5 degrees) or smaller. If the absolute value of the first elevation angle is greater than or equal to a second predetermined angle (for example, 60 degrees) that is greater than the first predetermined angle (for example, 5 degrees), the elevation angle calculator 123 determines, as a second elevation angle, an inverse cosine of a value that is obtained by dividing a value, which is obtained by correcting, with the correction value, the altitude obtained by the pressure sensor 133, by the distance that is measured by the distance measurement unit 122. With this arrangement, if the absolute value of the first elevation angle is greater than or equal to a second predetermined angle (for example, 60 degrees) that is greater than a first predetermined angle (for example, 5 degrees), and an error in the first the elevation angle that is determined based on phases received by multiple antenna elements 112 of the array antenna 110 is large, the second elevation angle can be determined using the altitude obtained by the pressure sensor 133 and the correction value, instead of using the first elevation angle.

Thus, when a given elevation angle becomes great, the given elevation angle is determined based on the distance that is obtained by making corrections using the pressure sensor 133. The positioning system 100 capable of reducing an error in measuring a given angle can be provided.

The first predetermined angle (for example, 5 degrees) is an angle at which the elevation angle that is defined in a case of being directly above the array antenna 110 is within a predetermined range of inclined angles, and the predetermined range of the inclined angles is a range in which the aircraft 130 is considered to be directly above the array antenna 110. In view of the situation described above, when the aircraft 130 is present approximately directly above the array antenna 110, a given correction value can be determined using a distance measured using the ToA technique by the distance measurement unit 122 (the distance corresponding to the altitude of the aircraft 130) and the altitude measured by the pressure sensor 133.

If the absolute value of the first elevation angle becomes the first predetermined angle (for example, 5 degrees) or smaller, the correction calculator 124 determines the difference between the altitude obtained by the pressure sensor 133 and the distance measured by the distance measurement unit 122 as the correction value, and then updates the correction value. With this arrangement, when the aircraft 130 is present approximately directly above the array antenna 110, the correction value can be updated to a latest correction value.

In addition, the pressure sensor 133 is a pressure sensor that measures the altitude of the aircraft 130 based on the pressure. With this arrangement, the altitude of the aircraft 130 can be detected accurately, and thus the correction value can be determined with high accuracy. When errors in a given first elevation angle that is determined based on phases received by the multiple antenna elements 112 of the array antenna 110 are large, a given second elevation angle can be determined with high accuracy by using the altitude obtained by the pressure sensor 133 and the correction value, instead of using the given first elevation angle.

Further, the distance measurement unit 122, the elevation angle calculator 123, and the correction calculator 124 are provided on an array antenna 110-side, and the array antenna 110 includes three or more antenna elements 112. With this arrangement, the distance between the array antenna 110 and the aircraft 130, and the correction value can be stably determined by the controller 120 that is installed on the ground or a fixed object, which is provided on the ground. Also, the first elevation angle can be stably determined using one or more phase differences that is obtained using three or more antenna elements 112. In addition, the second elevation angle can be stably determined using the distance and the correction value that are stably determined.

The communication unit 132 includes one antenna device 132A. In this case, under a condition in which the ground-side controller 120 determines a given distance, a given correction value, a given first elevation angle, and a given second elevation angle, the communication unit 132 of the aircraft 130 can be configured to measure one or more phases of signals that are received from the array antenna 110, and transmit the signal in a case where the controller 120 measures the elevation angle and the azimuth angle of the aircraft 130, using the AoA technique. Thus, the configuration of the aircraft 130 can be simplified.

Modifications

In the above description, the ground-side controller 120 measures the distance using the ToA technique, measures the first elevation angle and the azimuth angle, using the AOA technique, determines the correction value, and determines the elevation angle 2. However, the controller 131 of the aircraft 130 may measure the distance using the ToA technique, measure the first elevation angle and the azimuth angle, using the AOA technique, determine the correction value, and determine the second elevation angle. In this case, the communication unit 132 of the aircraft 130 may include multiple antenna elements 132A to detect phase differences of signals, when measuring the first elevation angle and the azimuth angle, using the AOA technique. In this case, at least one antenna element 112 may be provided on the ground side, instead of providing the array antenna 110.

Although the positioning system according to one or more exemplary embodiments of the present disclosure is described above, the present disclosure is not limited to one or more specifically disclosed embodiments, and various modifications and changes can be made without departing from the scope of the present disclosure.

In the above embodiments, the following items are further disclosed.

Item 1

A positioning system includes:
a first communication unit;
an aircraft movable with respect to the first communication unit;
a second communication unit provided on the aircraft and configured to communicate with the first communication unit;
an altitude measurement unit provided on the aircraft and configured to measure an altitude of the aircraft with respect to the first communication unit;
a distance measurement unit configured to measure a distance between the first communication unit and the aircraft, based on a propagation time or a phase of at least one signal that is communicated between the first communication unit and the second communication unit;
an elevation angle calculator configured to determine a first elevation angle of the aircraft with respect to the first communication unit, based on phases that are obtained in a case where signals communicated between the first communication unit and the second communication unit are received by multiple antenna elements of either the first communication unit or the second communication unit; and
a correction calculator configured to determine, as a correction value, a difference between the altitude measured by the altitude measurement unit and the distance measured by the distance measurement unit, upon occurrence of a condition in which an absolute value of the first elevation angle is a first predetermined angle or smaller,
wherein after the correction calculator determines the correction value,
the elevation angle calculator is configured to
determine, as a second elevation angle, an inverse cosine of a first value, upon occurrence of a condition in which the absolute value of the first elevation angle is greater than or equal to a second predetermined angle, the second predetermined angle being greater than the first predetermined angle, the first value being obtained by dividing a second value that is obtained by correcting, with the correction value, the altitude measured by the altitude measurement unit, by the distance measured by the distance measurement unit, and
select any one of the first elevation angle and the second elevation angle, based on a value of the first elevation angle.

Item 2

In the positioning system according to item 1, the first elevation angle is determined based on angles of arrival (AoA) of signals, and the second elevation angle is determined based on time of arrival (ToA) of the signal.

Item 3

In the positioning system according to item 1 or 2, the first predetermined angle is within a predetermined range of inclined angles, under a condition in which the aircraft is directly above the first communication unit.

Item 4

In the positioning system according to any one of items 1 to 3, the correction calculator is configured to determine, as the correction value, a difference between the measured altitude and the measured distance, upon occurrence of a condition in which the absolute value of the first elevation angle is the first predetermined angle or smaller; and update the correction value.

Item 5

In the positioning system according to any one of items 1 to 4, the altitude measurement unit includes a pressure sensor configured to measure the altitude of the aircraft, based on a measured pressure.

Item 6

In the positioning system according to any one of items 1 to 5, the distance measurement unit, the elevation angle calculator, and the correction calculator are provided on a first communication unit-side, and the first communication unit includes three or more antenna elements.

Item 7

In the positioning system according to item 6, the second communication unit includes one antenna element.

When an elevation angle is large, the elevation angle is determined based on a distance that is obtained by making corrections using an altitude measurement unit, thereby providing a positioning system capable of reducing errors in measuring an angle.

What is claimed is:
1. A positioning system comprising:
a first communication unit;
an aircraft movable with respect to the first communication unit;
a second communication unit provided on the aircraft and configured to communicate with the first communication unit;
an altitude measurement unit provided on the aircraft and configured to measure an altitude of the aircraft with respect to the first communication unit;

a distance measurement unit configured to measure a distance between the first communication unit and the aircraft, based on a propagation time or a phase of at least one signal that is communicated between the first communication unit and the second communication unit;

an elevation angle calculator configured to determine a first elevation angle of the aircraft with respect to the first communication unit, based on phases that are obtained in a case where signals communicated between the first communication unit and the second communication unit are received by multiple antenna elements of either the first communication unit or the second communication unit; and a correction calculator configured to determine, as a correction value, a difference between the altitude measured by the altitude measurement unit and the distance measured by the distance measurement unit, upon occurrence of a condition in which an absolute value of the first elevation angle is a first predetermined angle or smaller, wherein after the correction calculator determines the correction value, the elevation angle calculator is configured to determine, as a second elevation angle, an inverse cosine of a first value, upon occurrence of a condition in which the absolute value of the first elevation angle is greater than or equal to a second predetermined angle, the second predetermined angle being greater than the first predetermined angle, the first value being obtained by dividing a second value that is obtained by correcting, with the correction value, the altitude measured by the altitude measurement unit, by the distance measured by the distance measurement unit, and select any one of the first elevation angle and the second elevation angle, based on a value of the first elevation angle.

2. The positioning system according to claim 1, wherein the first elevation angle is determined based on angles of arrival (AoA) of signals, and the second elevation angle is determined based on time of arrival (ToA) of the signal.

3. The positioning system according to claim 1, wherein the first predetermined angle is within a predetermined range of inclined angles, under a condition in which the aircraft is directly above the first communication unit.

4. The positioning system according to claim 1, wherein the correction calculator is configured to determine, as the correction value, a difference between the measured altitude and the measured distance, upon occurrence of a condition in which the absolute value of the first elevation angle is the first predetermined angle or smaller, and update the correction value.

5. The positioning system according to claim 1, wherein the altitude measurement unit includes a pressure sensor configured to measure the altitude of the aircraft, based on a measured pressure.

6. The positioning system according to claim 1, wherein the distance measurement unit, the elevation angle calculator, and the correction calculator are provided on a first communication unit-side, and wherein the first communication unit includes three or more antenna elements.

7. The positioning system according to claim 6, wherein the second communication unit includes one antenna element.

* * * * *